US007850132B2

(12) United States Patent
Chen et al.

(10) Patent No.: US 7,850,132 B2
(45) Date of Patent: Dec. 14, 2010

(54) SUPPORTING MECHANISM FOR ELECTRONIC DEVICE

(75) Inventors: Yun-Lung Chen, Taipei Hsien (TW); Bang-Chun Ding, Shenzhen (CN); Gang Su, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/327,638

(22) Filed: Dec. 3, 2008

(65) Prior Publication Data
US 2009/0321591 A1    Dec. 31, 2009

(30) Foreign Application Priority Data
Jun. 30, 2008    (CN) .................... 2008 2 0301360 U (51) Int. Cl.
| A47B 91/00 | (2006.01) |
| F16M 11/20 | (2006.01) |
| F16M 13/00 | (2006.01) |
| A47F 5/00 | (2006.01) |
| E04G 25/00 | (2006.01) |
| A47G 1/24 | (2006.01) |
| G06F 1/16 | (2006.01) |
| H05K 5/00 | (2006.01) |
| H05K 7/00 | (2006.01) |

(52) U.S. Cl. .................. 248/188.8; 248/351; 248/354.1; 248/673; 248/676; 248/677; 248/454; 248/688; 248/472; 361/679.05; 361/679.21; 361/679.2

(58) Field of Classification Search ................. 248/161, 248/346.03, 188.8, 351, 354.1, 673, 676, 248/677, 454, 917, 919, 920, 922, 923, 924, 248/462, 688, 472; 361/679.05, 679.21, 361/679.2
See application file for complete search history.

(56) References Cited

U.S. PATENT DOCUMENTS

| 6,570,627 | B1 * | 5/2003 | Chang | 348/794 |
| 6,918,564 | B2 * | 7/2005 | Yen et al. | 248/404 |
| 7,011,285 | B2 * | 3/2006 | Wang et al. | 248/673 |
| 7,036,787 | B1 * | 5/2006 | Lin | 248/676 |
| 7,478,784 | B2 * | 1/2009 | Wang | 248/161 |
| 7,566,043 | B2 * | 7/2009 | Chen | 248/616 |
| 2002/0003198 | A1 * | 1/2002 | Hsieh et al. | 248/351 |
| 2004/0084588 | A1 * | 5/2004 | Liu et al. | 248/291.1 |
| 2005/0040311 | A1 * | 2/2005 | Lee | 248/454 |

(Continued)

Primary Examiner—Terrell Mckinnon
Assistant Examiner—Christopher Garft
(74) Attorney, Agent, or Firm—Clifford O. Chi (57) ABSTRACT

A supporting mechanism for an electronic device includes a connecting bracket configured to connect to the electronic device and a supporting bracket connected to the connecting bracket and configured to support the electronic device. The supporting bracket includes a supporting portion having a receiving space, a locating member received in the receiving space, a supporting plate, and a resilient sliding member engaged in the locating member. A sliding slot is defined in the locating member. The resilient sliding member is secured on the supporting plate through the sliding slot. The resilient sliding member is compressed to disengage from the locating member, and slide in the sliding slot with the supporting plate relative to the locating member and the supporting portion along an extending direction of the supporting portion to change a length of the supporting bracket.

15 Claims, 6 Drawing Sheets

U.S. PATENT DOCUMENTS

2005/0263660 A1* 12/2005 Hsiung .................... 248/291.1
2006/0166083 A1* 7/2006 Zhang et al. .................. 429/97
2007/0075208 A1* 4/2007 Chen .......................... 248/455

* cited by examiner

SUPPORTING MECHANISM FOR ELECTRONIC DEVICE

BACKGROUND

1. Technical Field

The present disclosure relates to supporting mechanisms and, more particularly, to a supporting mechanism for an electronic device.

2. Description of Related Art

An electronic device such as a display is generally connected to a base via a typical supporting mechanism capable of adjusting an angle of the display. A typical supporting mechanism usually includes a locating member that requires many screws to selectively position the display. The locating member has a complex structure, which increases the cost of the supporting mechanism, and makes it difficult and time consuming to adjust the angle of the display.

What is needed, therefore, is a supporting mechanism for an electronic device capable of allowing convenient adjustment of the electronic device.

DETAILED DESCRIPTION

Figure 1:
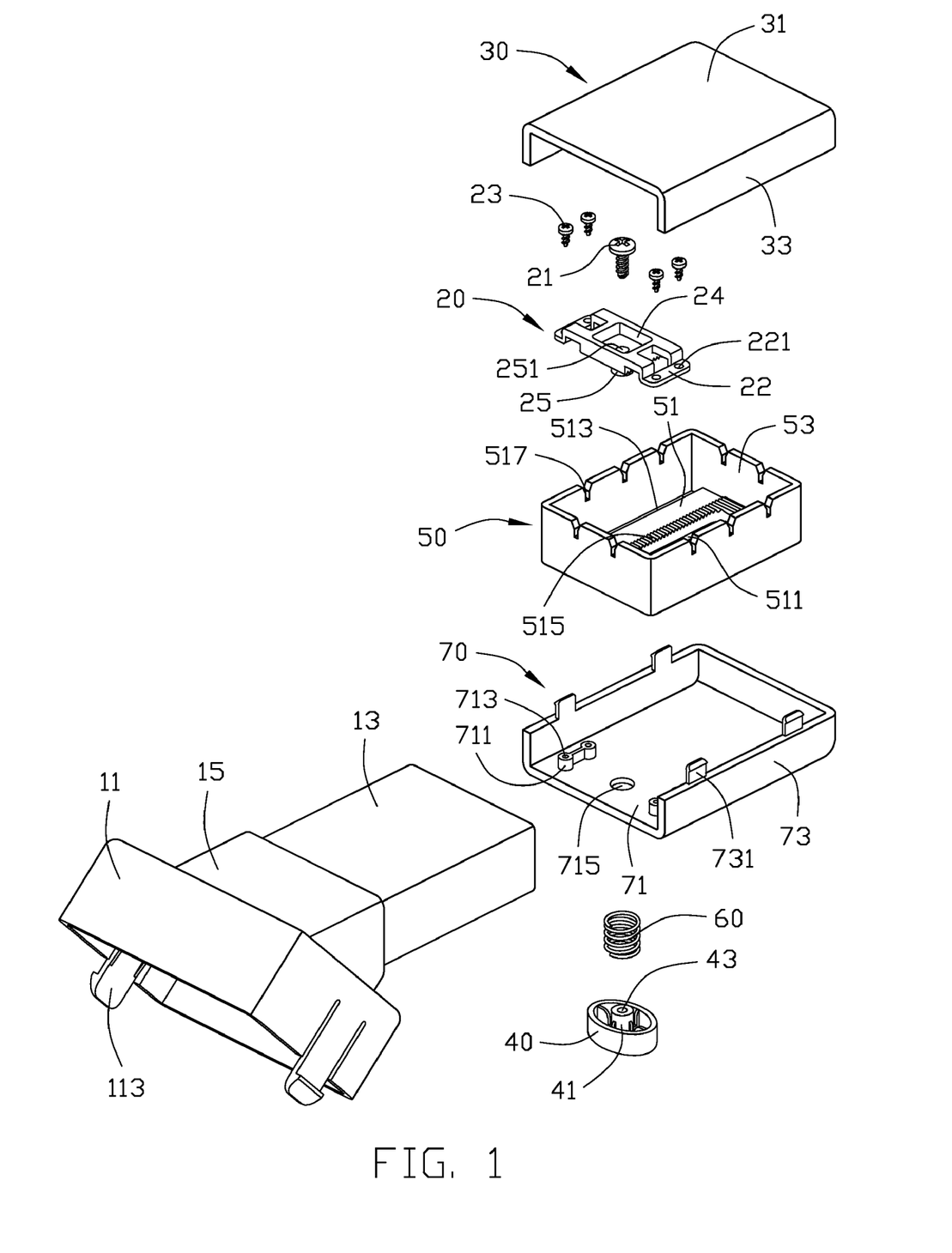
FIG. 1 is an exploded, isometric view of an embodiment of a supporting mechanism for an electronic device.
Figure 2:
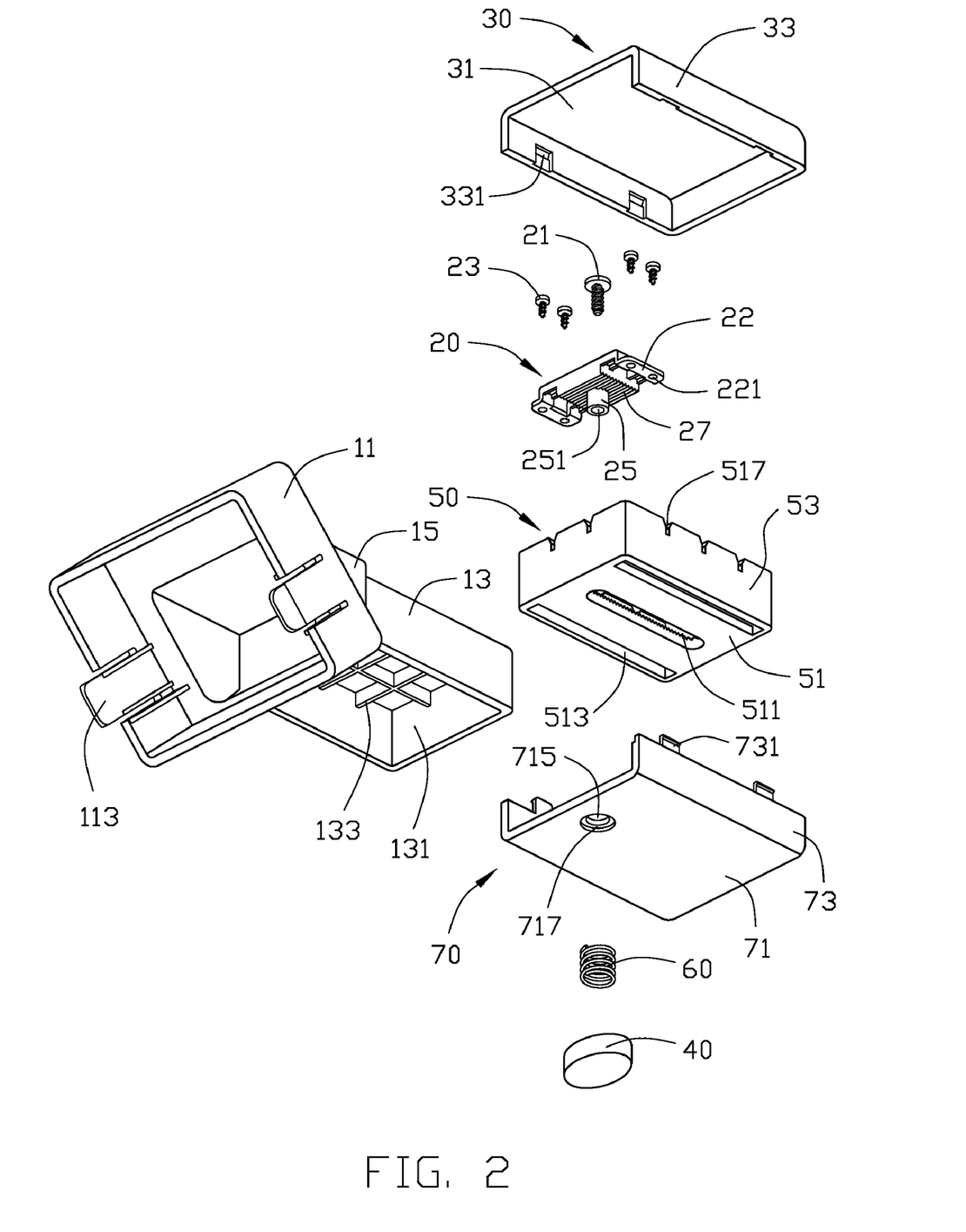
FIG. 2 is similar to FIG. 1, but viewed from another aspect.
Figure 3:
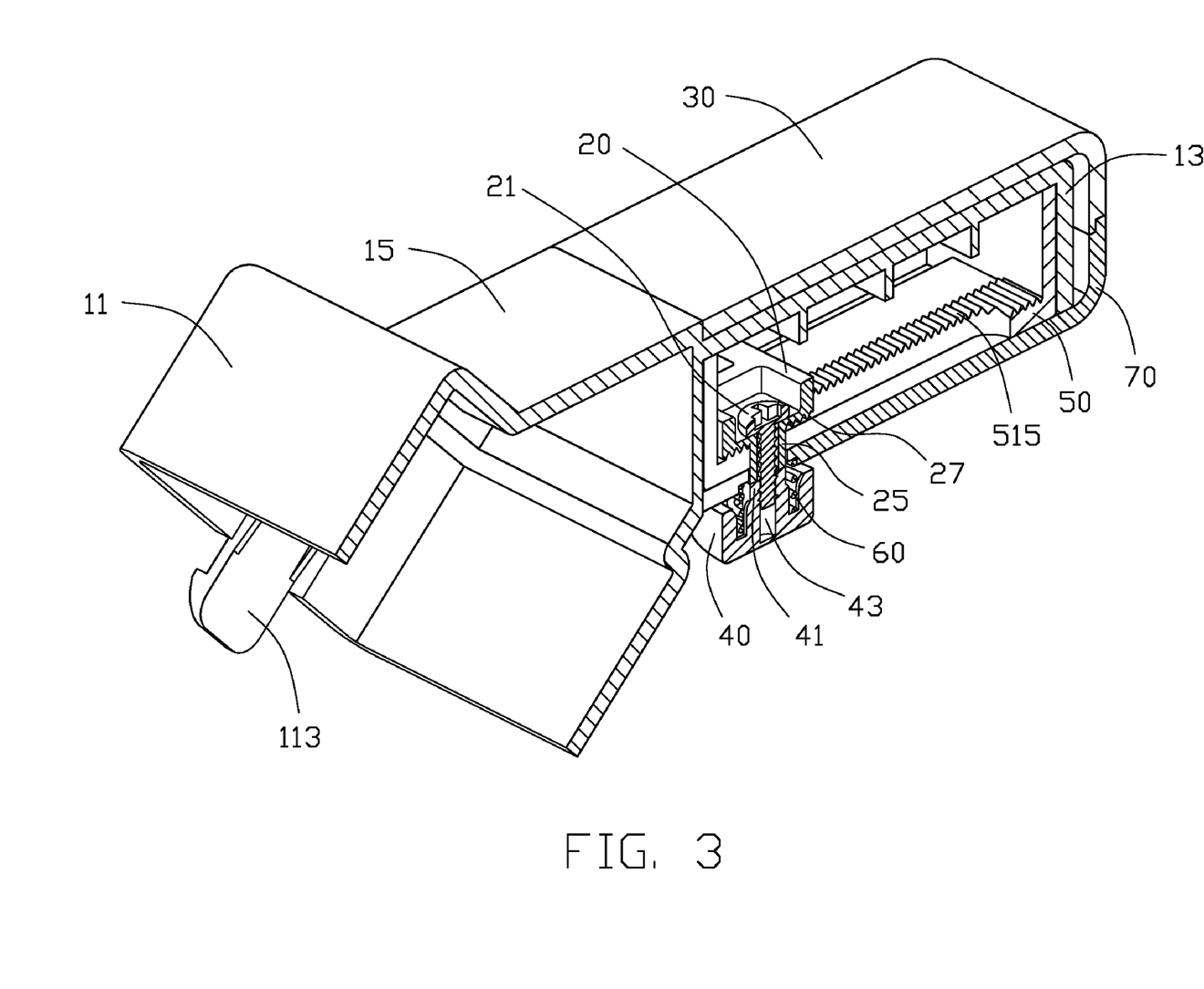
FIG. 3 is an assembled sectional view of the supporting mechanism for the electronic device of FIG. 1 shown in one state.

Referring to FIGS. 1 and 2, an embodiment of a supporting mechanism for an electronic device includes a connecting bracket 11, and a supporting bracket (not labeled) connected to the connecting bracket 11 at an angle. The supporting bracket includes a linking portion 15 connected to the connecting bracket 11, a supporting portion 13 connected to and forming a ladder-shape with the linking portion 15, a locating member 50 received in the supporting portion 13, a resilient sliding member 20, a top plate 30, a supporting plate 70, a pressing portion 40, and a resilient component 60. In the illustrated embodiment, the electronic device is a display 90 (see FIG. 4).

The connecting bracket 11 includes two resilient hooks 113 extending substantially perpendicularly from opposite sidewalls to connecting to the display 90. The supporting portion 13 has a substantially rectangular receiving space 131, and a plurality of supporting ribs 133 substantially perpendicular to each other are positioned in the receiving space 131.

The locating member 50 includes a bottom wall 51, and four sidewalls 53 extending substantially perpendicularly from the edges of the bottom wall 51. A narrow sliding slot 511 is defined in a center portion of the bottom wall 51 and running through the bottom wall 51. An undulating engaging surface 515 is formed on an inner surface of the bottom wall 51 around the sliding slot 511. Two rectangular grooves 513 are correspondingly defined in opposite sides of the bottom wall 51, and each groove 513 is longer than the sliding slot 511. A plurality of Y-shaped notches 517 are defined from a top edge of each sidewall 53 of the locating member 50. The locating member 50 is substantially the same size as the receiving space 131 of the supporting portion 13, such that the locating member 50 is received and secured in the receiving space 131, and the supporting ribs 133 of the receiving space 131 engage in the corresponding notches 517 of the locating member 50.

The resilient sliding member 20 includes an opening 24 defined in a top surface thereof. A toothed surface 27 is formed on a bottom surface of the resilient sliding member 20, and a post 25 protrudes substantially perpendicularly from a center portion of the toothed surface 27. A through hole 251 is defined in the post 25 for receiving a screw 21. Two bent pieces 22 extend from opposite sides of the resilient sliding member 20, and two mounting holes 221 are defined in each bent piece 22 for receiving screws 23.

The top plate 30 includes a top wall 31, and two sidewalls 33 extending substantially perpendicularly from opposite side edges of the top wall 31. Two securing portions 331 are defined in an inner surface of each sidewall 33.

The supporting plate 70 includes a bottom wall 71, and a receiving hole 715 is defined in one side of the bottom wall 71. A round hole is formed under the receiving hole 715, with a larger diameter than the receiving hole 715, thereby forming a stopping surface 717 between the round hole and the receiving hole 715. There is a barbell shaped protrusion 711 protruding from the bottom wall at opposite sides of the receiving hole 715. Two screw holes 713 are defined at each end of each of the barbell shaped protrusions 711. Two sidewalls 73 extend substantially perpendicularly from opposite sides of the bottom wall 71. Two elastic hooks 731 protrude from a top edge of each sidewall 73 corresponding to the securing portions 331 of the top plate 30. Each elastic hook 731 is configured to couple with the corresponding securing portion 331, thereby securing the top plate 30 to the supporting plate 70.

A fixing hole 43 is defined in a columnar positioning pin 41 of the pressing portion 40. The resilient component 60 is placed around the positioning pin 41, and exposed to one side of the pressing portion 40.

Figure 4:
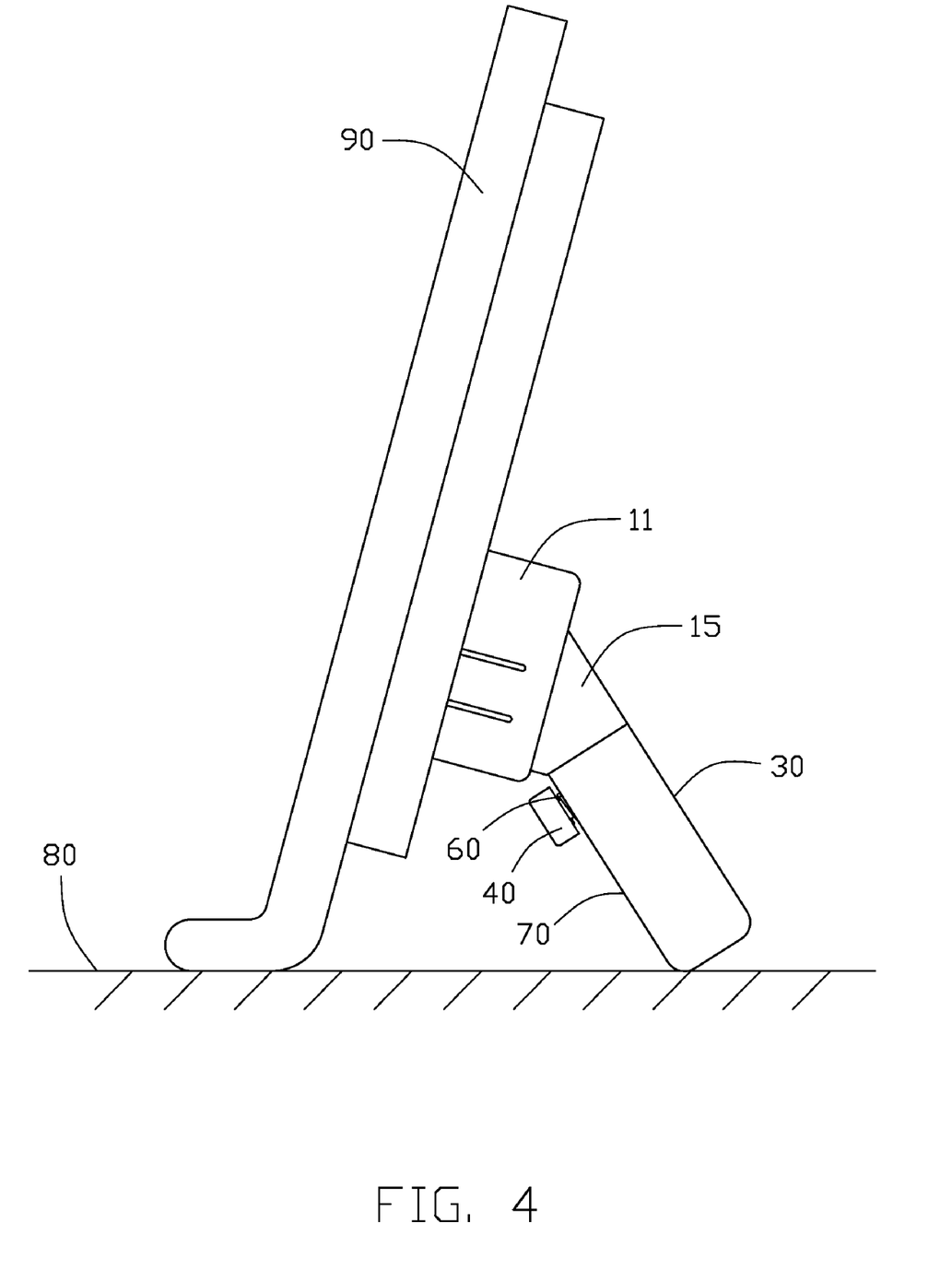
FIG. 4 is an assembled isometric view of the supporting mechanism and a display shown in one state.
Figure 5:
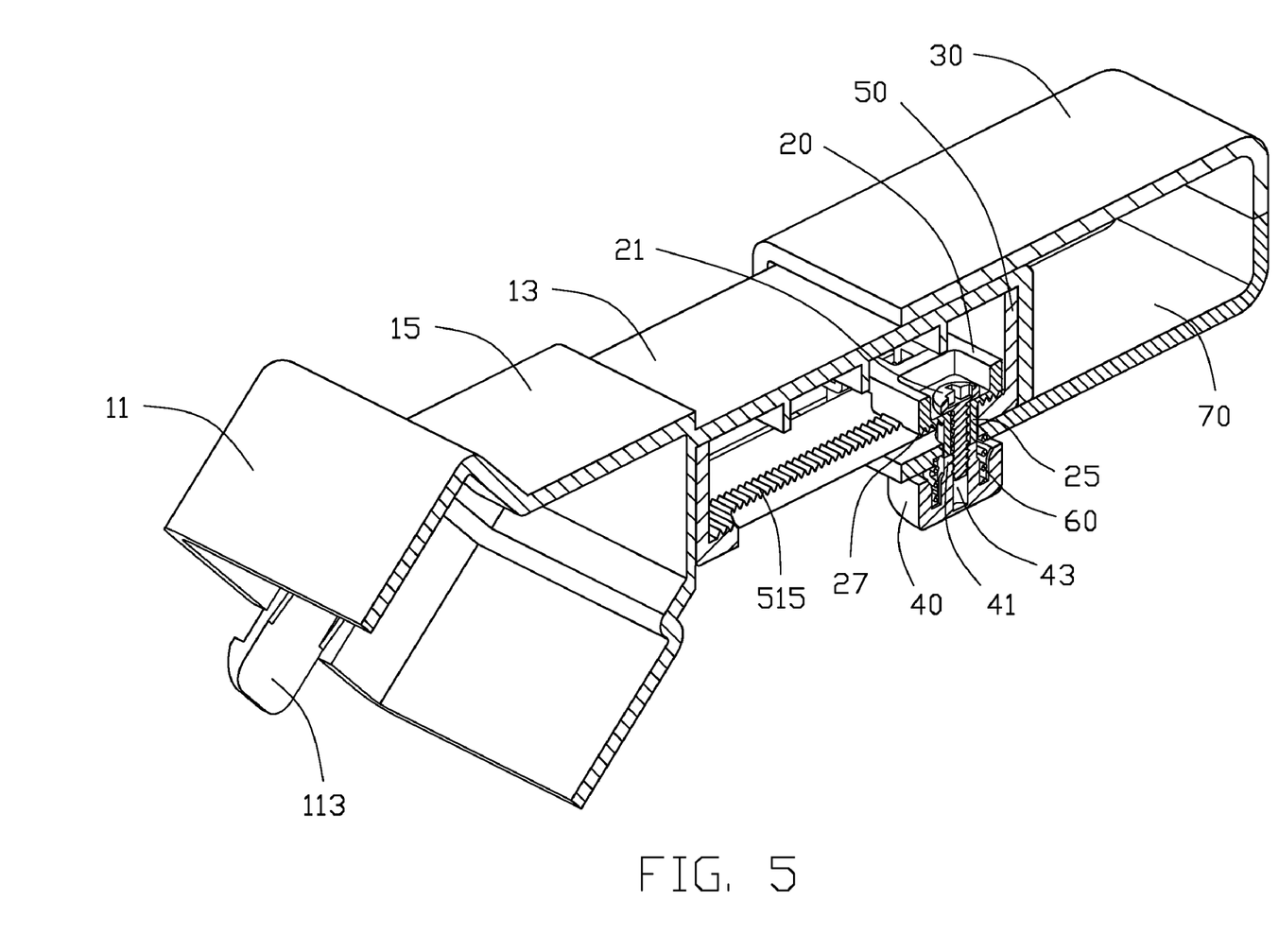
FIG. 5 is an assembled sectional view of the supporting mechanism for the electronic device shown in another state.

Referring to FIGS. 4 and 5, the pressing portion 40 having the resilient component 60 installed thereon is pushed toward the receiving hole 715. One end of the resilient component 60 abuts on the stopper surface 717, thereby forming a pressing space between the pressing portion 40 and the bottom wall 71. When the pressing portion 40 is pressed, the resilient component 60 will be compressed. The locating member 50 is placed in the supporting plate 70. The protrusions 711 of the supporting plate 70 correspondingly pass through the grooves 513 of the locating member 50, and are located in one side of the corresponding groove 513. One side of the sliding slot 511 is aligned with the receiving hole 715 of the supporting plate 70. The resilient sliding member 20 is placed in the locating member 50, and the toothed surface 27 of the resilient sliding member 20 engages with the engaging surface 515. The mounting holes 221 of the bent piece 22 are aligned with the corresponding screw holes 713 of the protrusions 711. The post 25 is received in the sliding slot 511 of the locating member 50 and the receiving hole 715 of the supporting plate 70, and abuts the positioning pin 41. The screw 21 is screwed into the fixing hole 43 of the pressing portion 40 through the through hole 251. The screws 23 are screwed into the corresponding screw holes 713 of the supporting plate 70 through the corresponding mounting holes 221 of the resilient sliding member 20, thereby securing the resilient sliding member 20 in one side of the locating member 50 and the supporting plate 70. The resilient sliding member 20, the locating member 50, and the supporting plate 70 are installed on the supporting portion 13. The supporting ribs 133 of the receiving space 131 of the supporting portion 13 are correspondingly engaged in the notches 517 of the locating member 50 to secure the locating member 50 in the receiving space 131. The opposite sidewalls of the supporting portion 13 are sandwiched between the sidewalls 53 of the locating member 50 and the sidewalls 73 of the supporting plate 70. Lastly, the top plate 30 is installed on the supporting portion 13, and the elastic hooks 731 of the supporting plate 70 are secured in the corresponding securing portions 331 of the top plate 30 to secure the top plate 30 on the supporting plate 70.

In use, the supporting mechanism is installed on the display 90, the resilient hooks 113 are secured on the display 90, and one end of the supporting plate 70 abuts a supporting surface 80, such that the display 90 is supported on the supporting surface 80 by the supporting mechanism.

Figure 6:
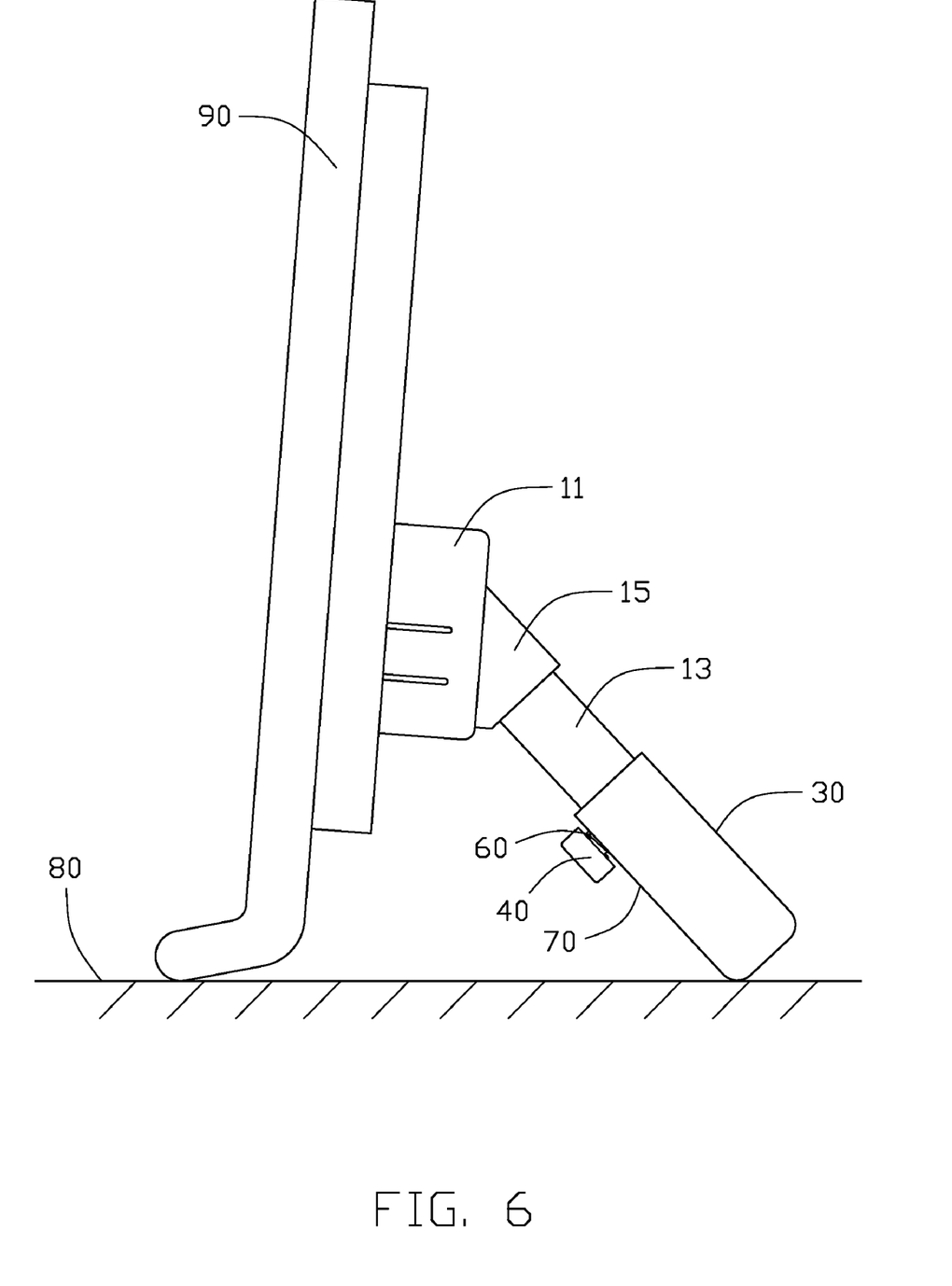
FIG. 6 is an assembled isometric view of the supporting mechanism and the display shown in another state.

Referring to FIGS. 5 and 6, to adjust the angle of the display 90, the pressing portion 40 is pressed to compress the resilient component 60. The positioning pin 41 of the pressing portion 40 abuts against the post 25 of the resilient sliding member 20, and the resilient sliding member 20 deforms elastically to disengage the toothed surface 27 of the resilient sliding member 20 from the engaging surface 515 of the locating member 50. The resilient sliding member 20, the top plate 30, and the supporting plate 70 slide along the sliding slot 511 and the two grooves 513. The length of the supporting bracket increases or decreases depending on the adjustment of the angle between the display 90 and the supporting surface 80. When a desired angle is obtained, the pressing portion 40 is released, and the resilient component 60 and the resilient sliding member 20 return back to their initial states. The toothed surface 27 of the resilient sliding member 20 engages in the engaging surface 515 of the locating member 50 again to maintain the display 90 at the desired angle.

It is to be understood, however, that even though numerous characteristics and advantages of the embodiments have been set forth in the foregoing description, together with details of the structure and function of the present disclosure, the disclosure is illustrative only, and changes may be made in detail, especially in matters of shape, size, and arrangement of parts within the principles of the embodiments to the full extent indicated by the broad general meaning of the terms in which the appended claims are expressed.

What is claimed is:

1. A supporting mechanism for an electronic device, comprising:
   a connecting bracket configured to connect to the electronic device; and
   a supporting bracket connected to the connecting bracket and configured to support the electronic device, the supporting bracket comprising a supporting portion having a receiving space, a locating member received in the receiving space, a supporting plate, and a resilient sliding member engaged in the locating member;
   wherein a sliding slot is defined in the locating member; the resilient sliding member is secured on the supporting plate through the sliding slot; the resilient sliding member is compressed and moves along a direction substantially perpendicular to an extending direction of the supporting portion to disengage from the locating member, and slide in the sliding slot with the supporting plate relative to the locating member and the supporting portion along the extending direction of the supporting portion to change a length of the supporting bracket;
   wherein the locating member comprises a bottom wall; the sliding slot is defined in the bottom wall; an engaging surface is formed on the bottom wall around the sliding slot; the resilient sliding member comprises a toothed surface configured to engage with the engaging surface.

2. The supporting mechanism of claim 1, wherein the supporting bracket further comprises a pressing portion and a resilient component installed thereon, the pressing portion comprises a positioning pin; the resilient sliding member comprises a post; the positioning pin abuts against the post when the pressing portion is pressed to disengage the toothed surface of the resilient sliding member from the engaging surface of the locating member.

3. The supporting mechanism of claim 2, wherein a receiving hole is defined in the supporting plate; the post abuts against the positioning pin through the sliding slot of the locating member and the receiving hole; a through hole is defined in the post; a fixing hole is defined in the positioning pin; a screw is screwed into the fixing hole through the through hole to secure the resilient sliding member and the pressing portion to the supporting plate.

4. The supporting mechanism of claim 1, wherein two bent pieces extend from opposite sides of the resilient sliding member; at least one mounting hole is defined in each bent piece to receive a screw; a groove is defined in the locating member corresponding to each mounting hole; a screw hole is defined in the supporting plate corresponding to each mounting hole; the screw is screwed into the corresponding screw hole through the mounting hole and the groove.

5. The supporting mechanism of claim 4, wherein a protrusion protrudes from the supporting plate corresponding to each groove configured to run through the corresponding groove; the screw holes are defined in the protrusions.

6. The supporting mechanism of claim 1, wherein the supporting bracket further comprises a top plate; at least one securing portion is defined in the top plate; an elastic hook extends from the supporting plate to couple with the securing portion.

7. The supporting mechanism of claim 1, wherein at least one notch is defined in a top edge of the locating member; a supporting rib is positioned in the receiving space of the supporting portion to engage in the notch.

8. A supporting mechanism for an electronic device, comprising:
   a supporting bracket configured to support the electronic device, the supporting bracket comprising a locating member, a resilient sliding member, and a supporting plate, the resilient sliding member is secured to the supporting plate and engages the locating member, the supporting plate is capable of sliding along an extending direction of the supporting bracket relative to the locating member when the resilient sliding member disengages from the locating member by compressing and moving the resilient sliding member along a direction that is substantially perpendicular to the extending direction, thereby changing a length of the supporting bracket to adjust an angle of the electronic device;
   wherein the supporting bracket further comprises a top plate, at least one securing portion is defined in the top plate; an elastic hook extends from the supporting plate to couple with the securing portion.

9. The supporting mechanism of claim 8, wherein a sliding slot is defined in the locating member; the supporting plate is configured to slide with the resilient sliding member in the sliding slot.

10. The supporting mechanism of claim 9, wherein the resilient sliding member is secured on the supporting plate through the sliding slot; the resilient sliding member is compressed to disengage from the locating member, and slide in the sliding slot with the supporting plate relative to the locating member along the extending direction of the supporting bracket to adjust the angle of the electronic device.

11. The supporting mechanism of claim 9, wherein the locating member comprises a bottom wall; the sliding slot is defined in the bottom wall; an engaging surface is formed on the bottom wall around the sliding slot; the resilient sliding member comprises a toothed surface configured for engaging with the engaging surface.

12. The supporting mechanism of claim 11, wherein the supporting bracket further comprises a pressing portion and a resilient component installed thereon, the pressing portion comprises a positioning pin; the resilient sliding member comprises a post; the positioning pin abuts against the post when the pressing portion is pressed to disengage the toothed surface of the resilient sliding member from the engaging surface of the locating member.

13. The supporting mechanism of claim 12, wherein a receiving hole is defined in the supporting plate; the post abuts against the positioning pin through the sliding slot of the locating member and the receiving hole; a through hole is defined in the post; a fixing hole is defined in the positioning pin; a screw is screwed in the fixing hole through the through hole to secure the resilient sliding member and the pressing portion to the supporting plate.

14. The supporting mechanism of claim 9, wherein two bent pieces extend from opposite sides of the resilient sliding member; at least one mounting hole is defined in each bent piece to receive a screw; a groove is defined in the locating member corresponding to each mounting hole; a screw hole is defined in the supporting plate corresponding to each mounting hole; the screw is screwed in the corresponding screw hole through the mounting hole and the groove.

15. The supporting mechanism of claim 8, wherein the supporting bracket further comprises a supporting portion having a receiving space, and the locating member is received in the receiving space; at least one notch is defined in a top edge of the locating member; a supporting rib is positioned in the receiving space of the supporting portion to engage in the notch.

* * * * *